US011866958B2

(12) United States Patent
Backhaus et al.

(10) Patent No.: US 11,866,958 B2
(45) Date of Patent: Jan. 9, 2024

(54) LOCKING DEVICE

(71) Applicants: BURG Lüling GmbH & Co. KG, Hagen (DE); USM U. Schärer Söhne AG, Munsingen (CH)

(72) Inventors: Dirk Backhaus, Hagen (DE); Christian Lüthi, Münsingen (CH)

(73) Assignees: BURG Lüling GmbH & Co. KG, Hagen (DE); USM U. Schärer Söhne AG, Münsingen (DE)

( * ) Notice: Subject to any disclaimer, the term of this patent is extended or adjusted under 35 U.S.C. 154(b) by 0 days.

(21) Appl. No.: 18/044,927

(22) PCT Filed: Sep. 15, 2021

(86) PCT No.: PCT/EP2021/075329
§ 371 (c)(1),
(2) Date: Mar. 10, 2023

(87) PCT Pub. No.: WO2022/063651
PCT Pub. Date: Mar. 31, 2022

(65) Prior Publication Data

US 2023/0358075 A1 Nov. 9, 2023

(30) Foreign Application Priority Data

Sep. 22, 2020 (DE) ..................... 20 2020 105 406.6

(51) Int. Cl.

| | |
|---|---|
| ***E05B 13/10*** | (2006.01) |
| ***E05B 47/00*** | (2006.01) |
| ***E05B 47/06*** | (2006.01) |

(52) U.S. Cl.
CPC ........ *E05B 13/101* (2013.01); *E05B 47/0038* (2013.01); *E05B 47/0657* (2013.01); *E05B 2047/0058* (2013.01)

(58) Field of Classification Search
CPC ............. E05B 47/0038; E05B 47/0043; E05B 47/0045; E05B 47/004; E05B 47/0657;
(Continued)

(56) References Cited

U.S. PATENT DOCUMENTS 6,449,991 B1 9/2002 Hogan
11,466,473 B2 * 10/2022 Barnett, III ......... E05B 47/0642
(Continued)

FOREIGN PATENT DOCUMENTS

DE 102007005214 B3 6/2008
DE 202008007068 U1 * 11/2009 ......... E05B 47/0615
(Continued)

OTHER PUBLICATIONS

Computer Generated Translation for DE 1020070521, Generated on Aug. 21, 2023, https://worldwide.espacenet.com/ (Year: 2023).*
(Continued)

*Primary Examiner* — Alyson M Merlino
(74) *Attorney, Agent, or Firm* — Oppedahl Patent Law Firm LLC

(57) ABSTRACT

The invention relates to a locking device for doors, compartments, and flaps. The stator is equipped with a battery-operated motor and an electronic control unit which acts on the motor. A handle (20) is connected to the rotor (30) so as to transmit a torque and is held on the rotor (30) by a clamping spring (50). The clamping spring (50) has a receiving area for a magnet (60). The process of replacing the battery for the motor is easily facilitated in that the clamping connection between the handle (20) and the rotor (30) is triggered by an external influence on the magnet (60) (FIG. 1).

11 Claims, 5 Drawing Sheets

Figure 1:
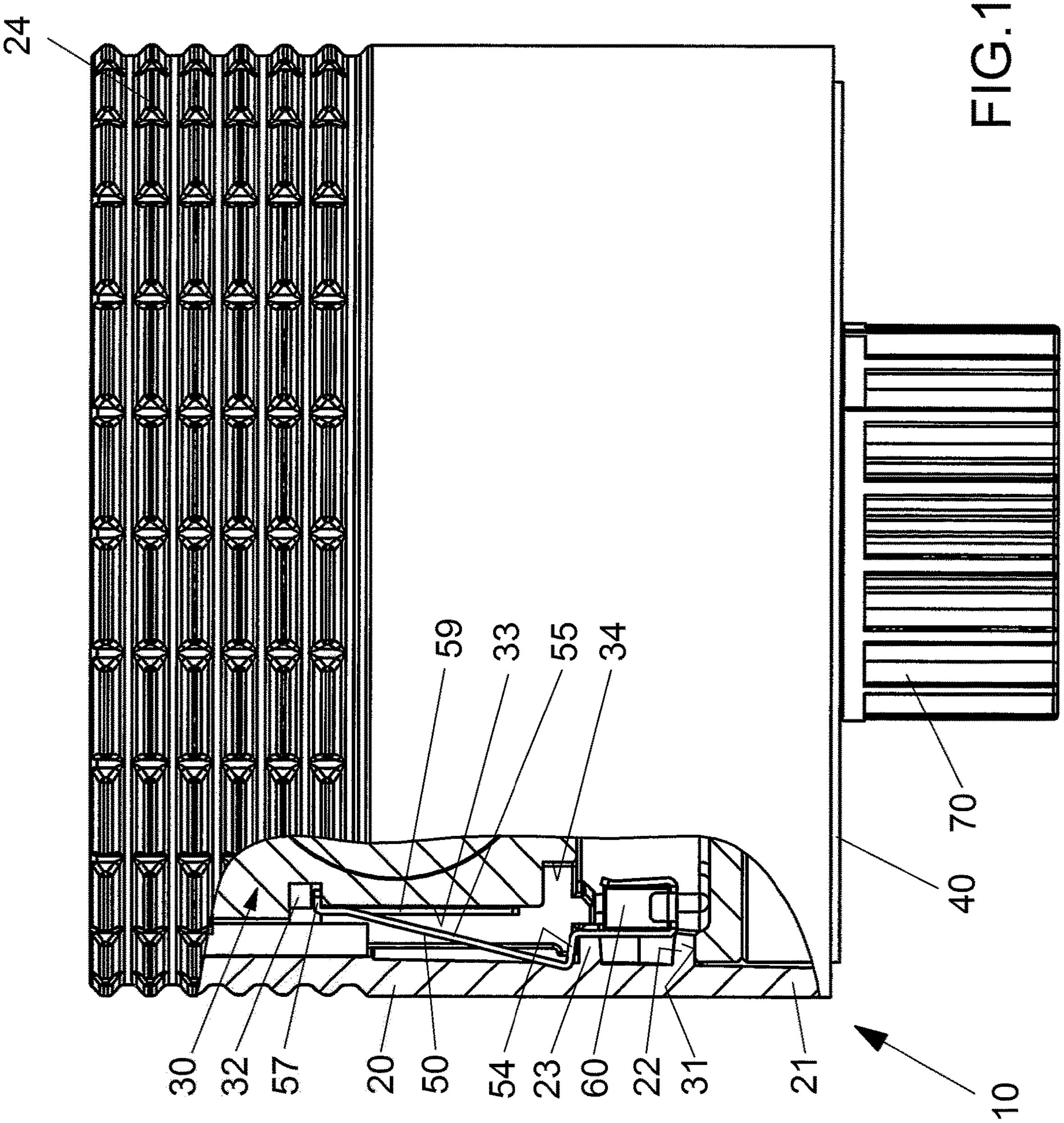

(58) Field of Classification Search
CPC ............. E05B 47/0665; E05B 47/0669; E05B 47/0673; E05B 47/0615
See application file for complete search history.

(56) References Cited

U.S. PATENT DOCUMENTS

| | | | | |
|---|---|---|---|---|
| 2008/0086844 | A1 | 4/2008 | Meyerle | |
| 2013/0192318 | A1* | 8/2013 | Yanar | E05B 47/0012<br>70/279.1 |
| 2015/0096341 | A1 | 4/2015 | Overgaard | |

FOREIGN PATENT DOCUMENTS

| | | | | |
|---|---|---|---|---|
| DE | 202012008020 | U1 * | 5/2013 | E05B 47/0615 |
| DE | 102018202563 | A1 | 8/2019 | |
| EP | 1908898 | A1 | 4/2008 | |
| EP | 2998485 | A1 * | 3/2016 | E05B 47/0615 |
| KR | 102147343 | B1 | 8/2020 | |
| WO | WO-9718371 | A1 * | 5/1997 | E05B 47/0038 |

OTHER PUBLICATIONS

International Search Report in PCT/EP2021/075329 dated Dec. 8, 2021.
International Preliminary Report on Patentability in PCT/EP2021/075329 dated Feb. 23, 2022.

* cited by examiner

LOCKING DEVICE

The invention relates to a locking device for doors, compartments and flaps, comprising a stator and a rotor which is rotatably mounted in the stator and which is connected directly or indirectly to a locking element. A handle in the form of a rotary knob, which is connected to the rotor in a torque-transmitting manner, can cause an opening or closing movement of the locking element by rotational movement.

Locking devices for doors, compartments and flaps with a rotary knob are known. In some embodiments of a locking device, electronic components and a motor, which is driven by batteries, are present in the rotary knob. Since replacement of the batteries is necessary after a certain period of use, it is desirable to allow access to the batteries in a simple manner.

The object of the present invention is to provide an improved locking device for doors, compartments and flaps, in which replacement of the batteries is possible in a simple manner.

The invention is achieved with a locking device having the features of claim 1. Advantageous embodiments are described in the dependent claims.

The novel locking device for doors, compartments and flaps permits simple assembly and disassembly of the handles and thus a simple replacement of the batteries arranged in the rotary knob.

The new locking device comprises a stator. Electronic and mechanical components for acting on a locking element are present in the housing-like stator. The electronic components belong to a control unit which, after checking a closing authorization, makes it possible to move the locking element. When the closing authorization is detected, a motor is actuated which causes the adjustment of an actuator. This actuator causes the locking of the rotation of the rotor and of the locking element connected to the rotor to be unlocked. This motor is driven via a battery. The rotor is rotatably mounted in the stator, which is connected directly or indirectly to a locking element. A handle in the form of a rotary knob is provided for moving the rotor. In a preferred embodiment, this handle is a cylindrical cap and completely covers both the rotor and the stator. Such a cap consists of a cylinder which is closed on one side, wherein the cylinder is plugged with its opening via the stator and rotor, so that the cylinder jacket and the closed upper side cover the rotor and stator.

The handle of the new locking device is held on the rotor by means of a clamping connection by means of a clamping spring. This clamping connection permits a torque-transmitting action of the handle on the rotor, so that upon rotation of the handle the rotor is rotated and the locking element performs an opening or closing movement. The clamping spring between the handle and the rotor additionally has a receptacle for a magnet. This magnet serves solely to facilitate disassembly of the handle. The clamping connection between the handle and the rotor is released by external action on the magnet. For this purpose, a further magnet is brought from the outside to the handle and brought into the vicinity of the magnet held on the clamping spring. The magnet mounted on the clamping spring is moved by magnetic action (attraction and/or repulsion). Such a movement of the magnet changes either the position of the entire clamping spring or changes the position of individual sections of the clamping spring relative to one another, which leads to a release of the clamping connection in accordance with the selected arrangement of the clamping spring between the handle and the rotor and the configuration of the clamping spring, so that the handle can be pulled off. This gives access to the internal battery, which can be removed and a new battery inserted. In order to simplify the positioning of the externally acting magnet during disassembly, in a preferred embodiment the handle is provided with a marking.

A particularly simple disassembly is possible by means of a disassembly or removal tool which comprises the magnet acting from the outside on the locking device. Furthermore, the removal tool has a marking adapted to the identification of the handle. In a preferred embodiment, the removal tool is a disassembly ring with a suitable shape and a suitable inner diameter, which is pushed over the handle and, during its contact movement, brings its magnets nearby to the magnets mounted in the clamping spring and causes the clamping connection to be released by the magnetic attraction.

Figure 2:
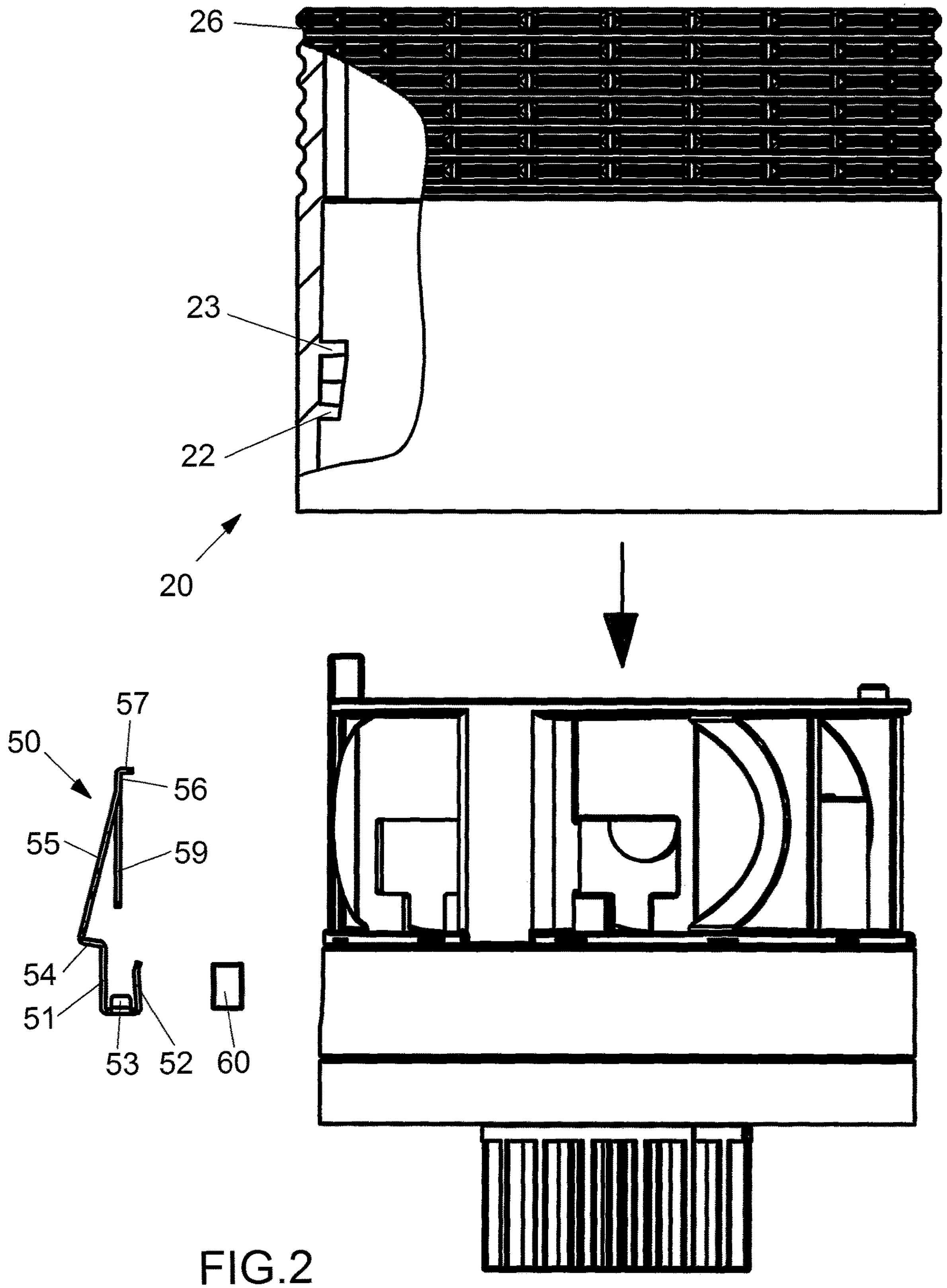
Figure 3:
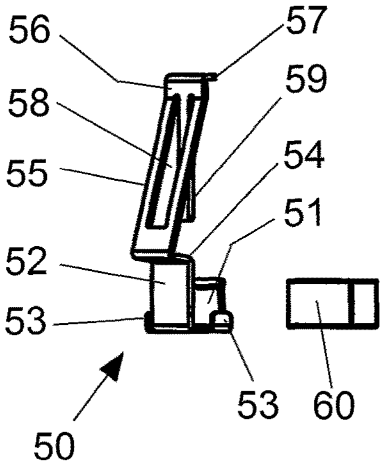
Figure 4:
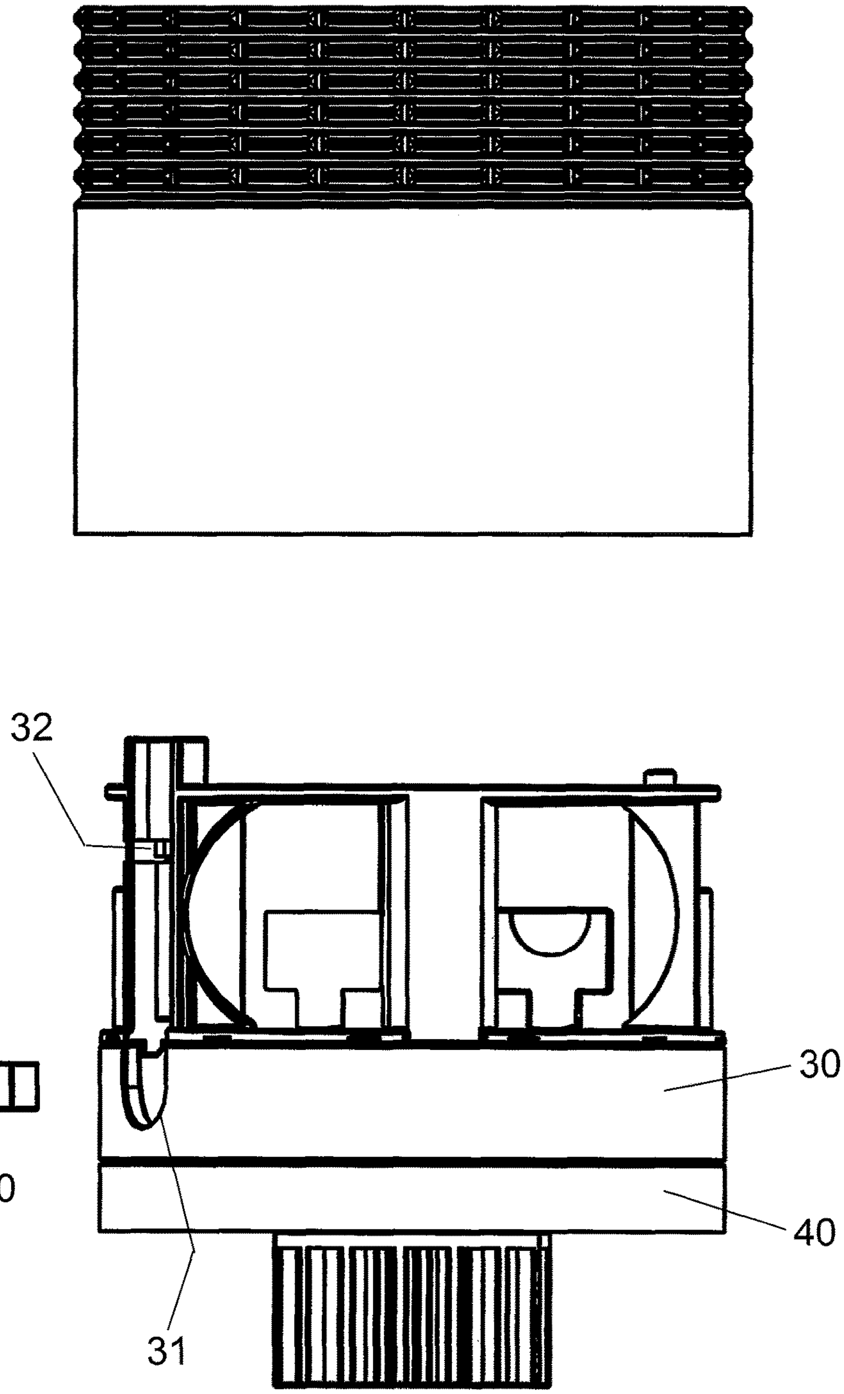
Figure 5:
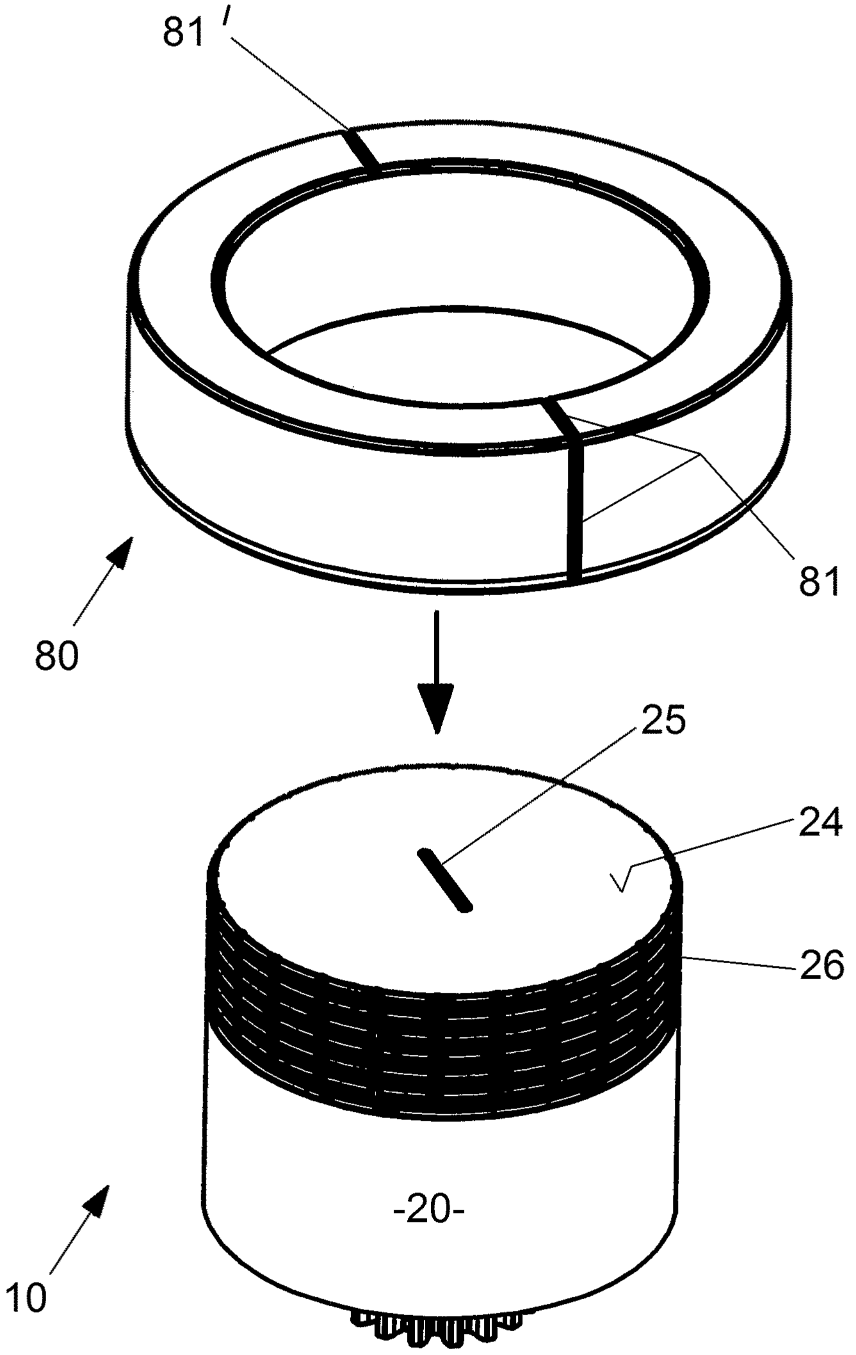
Figure 6:
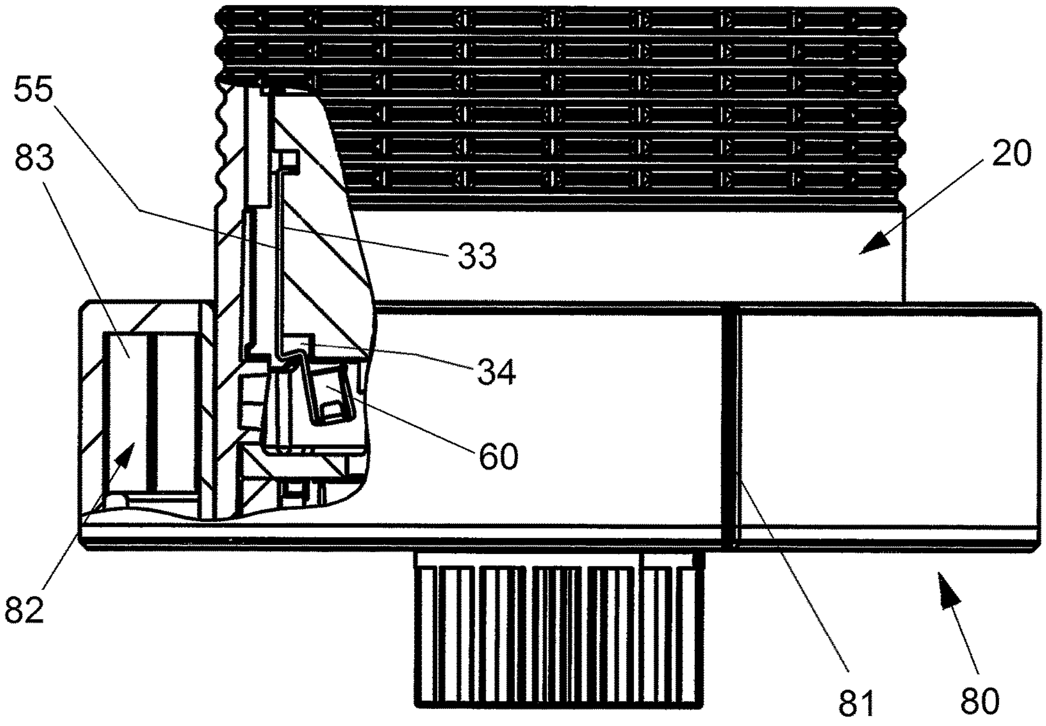

The invention is described below with reference to an exemplary embodiment. The drawing comprises:

FIG. 1 showing a side view of an embodiment of a locking device according to the invention, FIG. 2 showing a side view of the locking device of FIG. 1 prior to the assembly of the handle, FIG. 3 showing a perspective view of the clamping spring, FIG. 4 showing a further side view of the locking device of FIG. 1 prior to the assembly of the handle, FIG. 5 showing a perspective view of the locking device according to FIG. 1 with a disassembly ring before disassembly, FIG. 6 showing a perspective view of the locking device according to FIG. 1 with a disassembly ring during disassembly.

FIG. 1 shows the locking device 10 for doors, compartments and flaps according to the invention. The locking device 10 comprises a stator 40 and a rotor 30 rotatably mounted within the stator 40. Mechanical components and an electronic control unit, a motor and a battery are present in the stator 40. When a closing authorization is received at the locking device, the motor is activated, which causes a change in position of an actuator. This change in position of the actuator results in an unlocking of the rotation of the rotor 30 and of the locking element connected to the rotor 30. The aforementioned mechanical and electronic components are not shown. In this example, the rotor 30 is connected in a rotationally fixed manner to a drive wheel 70 which, during a rotational movement of the rotor 30, moves a locking element (not shown). The rotational movement of the rotor 30 is effected by means of a handle 20.

The handle 20 is a cap which consists of a cylinder which is closed on one face, wherein the cylinder jacket 21 and the closed upper side 24 cover the rotor 30 and stator 40. The handle 20 is held on the rotor 30 by means of a clamping spring 50. A magnet 60 is mounted on the clamping spring 50, which magnet does not contribute to holding the handle 20 on the rotor 30, but is used solely for disassembling the handle 20. In this way, the clamping connection can be released again by external action on the magnet 60 and thus brought about movement of the magnet 60.

Before the release of the clamping connection is described, the configuration of the clamping spring 50 and the mounting of the handle 20 on the rotor 30 achieved by this clamping spring 50 will be discussed below. In this example, the clamping spring 50 is formed from a sheet metal strip. Strips of other materials are also possible as long as a sufficient clamping force can be achieved. The sheet metal strip of the clamping spring 50 forms a spring bar, as best seen in FIGS. 2 and 3, where the clamping spring 50 is shown separately in each case. The spring bar is bent over at the upper end to form a hook 57 and is shaped at the lower end to form a U-shaped bent holding arm 52. In this case, the holding arm 52 comprises a cuboid magnet 60. In order that the magnet 60 cannot slip laterally out of the U-shaped receiving space 51 of the holding arm 52, two angled portions 53 are additionally provided. The magnet 60 is thus enclosed all around and is securely mounted in the clamping spring 50. Between the upper and the lower end, the spring bar has a central clamping section, namely, starting from the holding arm 52, which has a vertically aligned leg, this is the adjoining horizontal bar section 54 and the angled bar section 55 adjoining upwards. The angled bar section 55 in turn merges into a vertical bar section 56, at the free end of which the hook 57 is located for engagement in the rotor 30. The middle clamping portion of the horizontal bar section 54 and the angled bar section 55 forms a nose which is oriented opposite to the hook 57. The angled bar section 55 is longer than the other bar portions, it extends over at least half the length of the entire spring bar. A punched-out portion 58 is present in this angled bar section 55, as a result of which a supporting bar 59 is formed. This supporting bar 59 is bent out of the angled bar section and in this case is oriented perpendicularly, so that it can be supported on the vertically formed wall 33 of the rotor 30.

In the case of an existing clamping connection between the rotor 30 and the handle 20, as shown in FIG. 1, the clamping spring 50 is inserted in the rotor 30. As best shown in FIG. 4, the rotor 30 has a recess 31 for this purpose, which is dimensioned so large that the holding arm 52 can be inserted with the magnet 60 into this recess 31. In this case, the inwardly directed hook 57 also engages in a slot 32 on the rotor 30. The slot 32 is somewhat wider, so that the hook 57 can move upward within the slot 32, if necessary during the assembly of the handle. When the clamping spring 50 is inserted, the nose formed from the horizontal bar section 54 and the angled bar section 55 points away from the rotor 30 and protrudes outwards. If the handle 20 is now pushed over the rotor 30 with the pre-assembled clamping spring 50, the handle 20 slides along the angled bar section 55 and over this nose. In order to secure the position of the clamping spring 50 and ensure the holding of the handle 20 on the rotor 30, inwardly directed projections or ribs are provided on the inside of the cylinder jacket 21 of the handle 20. As can be seen from FIG. 1, the first projection 22 is arranged in such a way that it is located in front of the recess 31 on the rotor 30 when there is an existing clamping connection. The second projection 23 is located above the first projection 22. It is arranged in such a way that, in the case of an existing clamping connection, it is located directly below the outwardly directed nose, which is formed from the horizontal bar section 54 and the angled bar section 55 of the clamping spring 50. If the handle 20 is placed on the rotor 30 from above, as indicated by the arrow in FIG. 2, first the first projection 22 slides and then the second (upper) projection 23 slides along the angled bar section 55, pressing the lug inward. After the second projection 23 has passed the nose, the latter is pressed outwards again by the spring force and continues in front of the second (upper) projection 23, as a result of which the handle 20 is prevented from being pulled off and thus the handle 20 is held securely.

To remove the handle 20, in this example, a disassembly ring 80 is used, which is shown in FIG. 5. This disassembly ring 80 is a double-walled tubular cylinder with vertically oriented inner and outer walls. The inner diameter of the disassembly ring 80 is adapted to the outer diameter of the cap-shaped handle 20 so that the disassembly ring 80 can slide along with its cylindrical inner side on the cylinder jacket 21 of the handle 20. As shown in FIG. 6, the disassembly ring 80 has, in the interior, a receptacle 82 for the extension and positioning of a magnet 83. With this outer magnet 83, it is possible to act on the magnet 60 mounted in the clamping spring 50 from the outside. In order to be able to exert a magnetic effect on the magnet 60 arranged within the handle 20, the outer magnet 83 must be in proximity to the inner magnet 60. Precise positioning is supported by corresponding markings on the handle 20 and on the disassembly ring 80. For this purpose, the handle 20 can have a marking on the outside of the cylinder jacket 21 and/or on the upper side 24. If the locking device 10 is a device which can also be locked mechanically by means of a key, the slot 25 for the key can also be used as such a marking, as shown in FIG. 5. The disassembly ring 80 also has a marking. In this example, the disassembly ring 80 has markings 81, 81' on its upper side and on its outer side. For precise positioning, the disassembly ring 80 is rotated such that the markings 81, 81' together with the slot 25 of the handle 20 lie on an imaginary line. The disassembly ring 80 then has the correct rotational position with respect to the locking device 10; see FIG. 5. If the disassembly ring 80 is now lowered downwards, that is, in the direction of the arrow, the outer magnet 83 approaches the inner magnet 60. In this example, the two magnets 60, 83 are aligned in such a way that magnetic repulsion of the inner magnet 60 is effected when the outer magnet 83 approaches. This inner magnet 60 is urged rearwardly into the rotor interior and thereby has a pulling effect on the clamping spring 50. In this case, the angled bar section 55 of the clamping spring 50 bears against the rotor wall 33 and the supporting bar 59 is located within the angled bar section 55. The outwardly projecting nose is pulled past the second projection 23. The inner corner between the horizontal bar section 54 and the holding arm 52 takes place in a shoulder 34 on the rotor 30. Due to the changed position of the clamping spring 50, the clamping action is released and the handle 20 can be pulled off. After removal of the disassembly ring 80, the clamping spring 50 moves back again. One now has access to the components of the locking device 10 and can exchange the battery. If appropriate, a new, structurally identical handle with a modified design can also be placed. The handle 20 shown has, in the upper cap half on the outside of the cylinder jacket 21, a surface structuring 26. This increases the grip and represents a design feature.

LIST OF REFERENCE NUMERALS

10 Locking device
20 Handle
21 Cylinder jacket
22 First projection
23 Second projection
24 Upper side
25 Slot
26 Surface structuring
30 Rotor
31 U-shaped recess
32 Slot
33 Wall
34 Shoulder
40 Stator
50 Clamping spring
51 U-shaped receiving space

52 Holding arm
53 Angled portions
54 Horizontal bar section
55 Angled bar section
56 Upper, vertical bar section
57 Hook
58 Punched-out portion
59 Supporting bar
60 Inner magnet
70 Drive wheel for locking element
80 Disassembly ring
81, 81' Markings
82 Receptacle
83 Outer magnet

The invention claimed is:

1. A locking device for doors, compartments, and flaps, the locking device comprising a stator, a rotor, which is rotatably mounted in the stator and is connected directly or indirectly to a locking element, a battery-operated motor, an electronic control unit acting on the motor being present in the stator, and a handle in the form of a rotary knob, which is connected to the rotor in a torque-transmitting manner, wherein the handle is held on the rotor by means of a clamping spring, wherein the clamping spring has a receptacle for a magnet, wherein in order to replace a battery for the motor, the clamping spring creates a clamping connection between the handle and the rotor, wherein the clamping connection is released by an external action on the magnet such that the handle is removable, and wherein the clamping spring is formed from a strip which forms a spring bar with a central clamping portion, a lower end of the spring bar forms a holding arm with a substantially U-shaped receiving space for the magnet, wherein the spring bar is bent at an upper end to form a hook.

2. The locking device according to claim 1, wherein when the clamping connection between the handle and the rotor is present, the hook engages in a slot on the rotor, wherein the slot is dimensioned such that the hook is movable within the slot when the clamping connection is released in order to remove the handle.

3. The locking device according to claim 1, wherein when the clamping connection between the handle and the rotor is present, the magnet engages in a recess on the rotor, wherein the recess is dimensioned such that the holding arm is movable inwards and/or downwards when the magnet is acted upon by the external action.

4. The locking device according to claim 1, wherein the central clamping portion consists of a horizontal bar section and an angled bar section, which form a nose directed outwards from the rotor, with the angled bar section extending over at least half of a length of the spring bar.

5. The locking device according to claim 4, wherein the angled bar section includes a punched-out portion therein, such that a support web is formed, which is aligned vertically and is supported on a vertically formed wall of the rotor.

6. The locking device according to claim 1, wherein the handle is a cap, which consists of a cylinder that is closed on an upper side and a cylinder jacket, wherein the closed upper side encloses the rotor and covers the stator when the clamping connection is present.

7. The locking device according to claim 6, wherein the handle has projections on an inside of the cylinder jacket, wherein a first projection of the projections is arranged such that it is located in front of a recess on the rotor when the clamping connection between the handle and the rotor is present.

8. The locking device according to claim 7, wherein a second projection of the projections is arranged above the first projection when the clamping connection between the handle and the rotor is present, the second projection is located immediately below an outwardly directed nose, which is formed from a horizontal web section and an angled bar section of the spring bar.

9. The locking device according to claim 8, wherein when the handle is located on the rotor, the second projection is slidable along an inclined web section of the spring into a clamping position such that the clamping connection between the handle and the rotor is present.

10. The locking device according to claim 1, wherein the handle has a surface structure on an outside of a cylinder jacket.

11. The locking device according to claim 1, wherein the handle has a marking on an outside of a cylinder jacket of the handle and/or a top of the handle in order to facilitate removal of the handle by facilitating a positioning of an outer magnet, which provides the external action on the magnet received by the clamping spring.

* * * * *